(No Model.)
W. T. CARROLL.
SPINDLE AND BEARING.
No. 332,992. Patented Dec. 22, 1885.
Fig. 1.
Fig. 2.
Fig. 3.
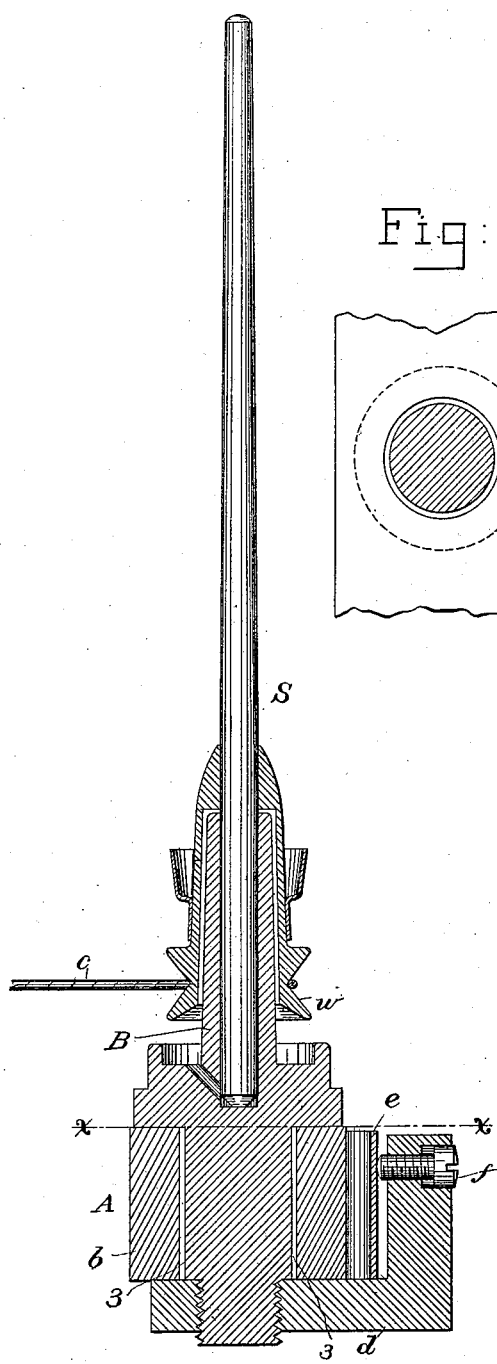
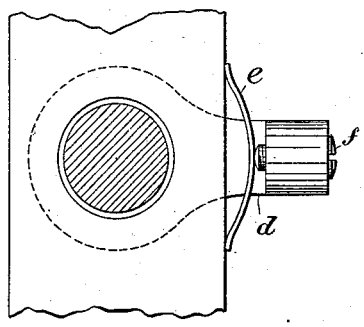
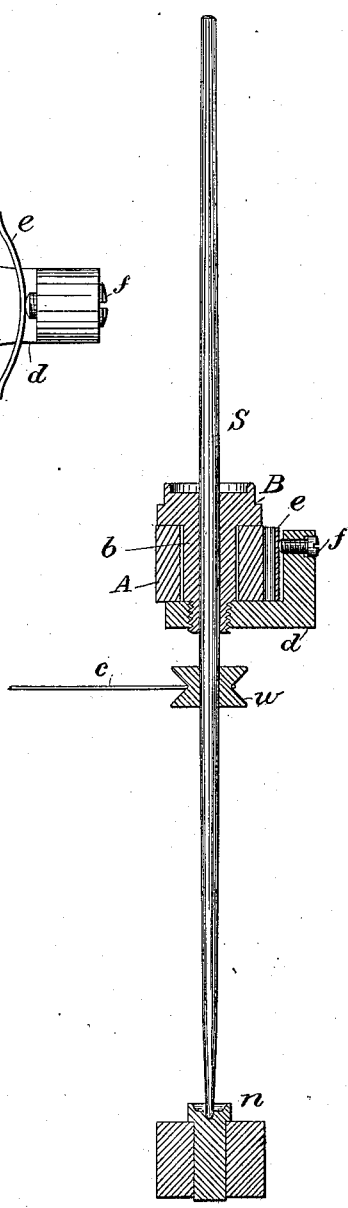
Witnesses.
John F. Nelson
John F. C. Prinkirk
Inventor.
William T. Carroll
By Crosby Gregory attys.
N. PETERS, Photo-Lithographer, Washington, D. C.

UNITED STATES PATENT OFFICE.

WILLIAM T. CARROLL, OF WORCESTER, ASSIGNOR TO SAWYER SPINDLE COMPANY, OF BOSTON, MASSACHUSETTS.

SPINDLE AND BEARING.

SPECIFICATION forming part of Letters Patent No. 332,992, dated December 22, 1885.

Application filed January 5, 1885. Serial No. 151,991. (No model.)

*To all whom it may concern:*

Be it known that I, WILLIAM T. CARROLL, of Worcester, county of Worcester, State of Massachusetts, have invented an Improvement in Spindles and Bearings, of which the following description, in connection with the accompanying drawings, is a specification, like letters on the drawings representing like parts.

This invention has for its object to improve the support for the spindle in such manner that inequalities in band-pull shall be compensated for by a spring, and this I have accomplished by interposing a spring between the rail and an arm or projection attached to the movable bearing in which the spindle is rotated, and from which it receives its lateral support.

I have shown my invention embodied with a sleeve whirl-spindle, and also with an ordinary spindle, in which the lateral bearing is located above the whirl.

Figure 1 is a view, mostly in vertical section, of a sleeve whirl-spindle, the bearings and support for the latter constructed to embody my invention, the spindle being in elevation. Fig. 2 is a section of Fig. 1 in the dotted line $x\ x$, and Fig. 3 is a section similar to Fig. 1 of a common spindle provided with my improvements.

The rail A, common to spinning-frames, receives loosely the shank $b$ of the bearing B, which constitutes the lateral or side support for the spindle S, in order to enable the spindle to stand when subjected to the pull of the usual band on the whirl. The bearing B has an arm or projection, $d$, attached to the lower end of its shank, which arm is turned upward outside of but close to the rail, and between the said arm and the side of the rail I have interspersed a spring, $e$, (shown as elliptical,) and I have provided the upright post of the said arm with an adjusting-screw, $f$. The screw is turned in against the spring sufficiently to enable the band $c$, under the proper amount of strain, to keep the shank midway or centrally in the hole of larger diameter in the rail in which the shank is placed, so as to leave a space, 3, about the shank, and in which the latter may move as the spindle finds its true center of rotation.

The band-pull exerted on the whirl located at some distance from the rail, and which tends to deflect the spindle out of perpendicular, is counteracted by the force of the spring $e$, which has a broad bearing at each end on the rail at its side.

In Fig. 3 the lateral bearing for the spindle is independent of the foot-step $n$, and the whirl is connected with the spindle between the lateral bearing and the foot-step, the latter being held in an independent rail, $n'$.

I claim—

1. The rail A and the spindle and its lateral bearing placed loosely in a hole in the said rail, combined with an arm or projection connected with the said lateral bearing and with a spring co-operating with the said rail and the arm or projection, to operate as and for the purpose set forth.

2. The rail A, the lateral bearing placed therein loosely, the spindle in the said bearing, an arm or projection connected with the said bearing, and an adjusting-screw, combined with a spring co-operating with the said rail, and the arm or projection, to operate as and for the purpose set forth.

In testimony whereof I have signed my name to this specification in the presence of two subscribing witnesses.

WILLIAM T. CARROLL.

Witnesses:
  A. WHEELER,
  GEO. A. DRAPER.